(12) United States Patent
Grinenval et al.

(10) Patent No.: US 10,457,292 B2
(45) Date of Patent: Oct. 29, 2019

(54) METHOD AND APPARATUS FOR OPERATING AN AUTOMATED MOTOR VEHICLE

(71) Applicant: Robert Bosch GmbH, Stuttgart (DE)

(72) Inventors: Charlotte Grinenval, Markgroeningen (DE); Christian Braeuchle, Hassmersheim-Hochhausen (DE); Konrad Hofmann, Ilsfeld (DE); Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 15/677,550

(22) Filed: Aug. 15, 2017

(65) Prior Publication Data

US 2018/0050701 A1 Feb. 22, 2018

(30) Foreign Application Priority Data

Aug. 17, 2016 (DE) .................. 10 2016 215 421

(51) Int. Cl.
| | |
|---|---|
| *B60W 40/08* | (2012.01) |
| *G05D 1/02* | (2006.01) |
| *B60W 40/09* | (2012.01) |
| *G05D 1/00* | (2006.01) |
| *G06Q 10/04* | (2012.01) |
| *G01C 21/34* | (2006.01) |

(52) U.S. Cl.
CPC ............ *B60W 40/08* (2013.01); *B60W 40/09* (2013.01); *G05D 1/0088* (2013.01); *G05D 1/0217* (2013.01); *G06Q 10/047* (2013.01); *G01C 21/3469* (2013.01); *G05D 2201/0213* (2013.01)

(58) Field of Classification Search
CPC .... B60W 40/08; B60W 40/09; G05D 1/0217; G05D 1/0088; G05D 2201/0213; G06Q 10/047; G01C 21/3469
USPC ....................................... 701/123, 1
See application file for complete search history.

(56) References Cited

U.S. PATENT DOCUMENTS

| | | | | |
|---|---|---|---|---|
| 9,910,441 | B2 * | 3/2018 | Levinson | G05D 1/0088 |
| 2003/0191568 | A1 * | 10/2003 | Breed | B60W 40/06 |
| | | | | 701/36 |
| 2011/0112730 | A1 * | 5/2011 | Rekow | G05D 1/0219 |
| | | | | 701/50 |
| 2014/0031972 | A1 * | 1/2014 | DeWitt | B65G 1/0421 |
| | | | | 700/214 |
| 2014/0350837 | A1 * | 11/2014 | Galbas | B60W 30/09 |
| | | | | 701/301 |
| 2015/0025708 | A1 * | 1/2015 | Anderson | A61B 5/6804 |
| | | | | 701/2 |
| 2015/0166072 | A1 * | 6/2015 | Powers | B60W 40/06 |
| | | | | 701/1 |

(Continued)

*Primary Examiner* — Jaime Figueroa
(74) *Attorney, Agent, or Firm* — Norton Rose Fulbright US LLP; Gerard Messina

(57) ABSTRACT

A method for operating an automated motor vehicle includes: ascertaining a target trajectory for the motor vehicle, acquiring environmental data of the motor vehicle, ascertaining a tolerance region of the target trajectory based on the acquired environmental data, and guiding the motor vehicle in the tolerance region of the target trajectory in such a way that guidance of the motor vehicle with the smallest possible changes in acceleration and/or with energetically optimized propulsion is definedly more highly prioritized than definedly accurate guidance of the motor vehicle along the target trajectory.

11 Claims, 2 Drawing Sheets

(56) References Cited

U.S. PATENT DOCUMENTS

| | | | |
|---|---|---|---|
| 2015/0177007 A1* | 6/2015 | Su | G01C 21/34 |
| | | | 701/25 |
| 2015/0251656 A1* | 9/2015 | Yester | B60W 30/09 |
| | | | 701/41 |
| 2016/0068156 A1* | 3/2016 | Horii | B60W 30/00 |
| | | | 701/28 |
| 2016/0163217 A1* | 6/2016 | Harkness | G09B 5/06 |
| | | | 434/65 |
| 2016/0200317 A1* | 7/2016 | Danzl | B60K 28/06 |
| | | | 701/25 |
| 2016/0357188 A1* | 12/2016 | Ansari | G05D 1/0212 |
| 2017/0144307 A1* | 5/2017 | Rublee | B25J 9/1676 |
| 2017/0301239 A1* | 10/2017 | Lee | G05D 1/0214 |
| 2018/0010915 A1* | 1/2018 | Wilhelm | G01C 21/20 |
| 2018/0058823 A1* | 3/2018 | Diaz | F41H 11/16 |

* cited by examiner

METHOD AND APPARATUS FOR OPERATING AN AUTOMATED MOTOR VEHICLE

CROSS-REFERENCE TO RELATED APPLICATIONS

The present application claims priority under 35 U.S.C. § 119 to DE 10 2016 215 421.4, filed in the Federal Republic of Germany on Aug. 17, 2016, the content of which is hereby incorporated by reference herein in its entirety.

FIELD OF THE INVENTION

The present invention relates to a method and/or apparatus for operating an automated motor vehicle.

BACKGROUND

For highly automated driving, trajectories for positioning of the vehicle are specified nowadays by a trajectory planner. The fundamental objective pursued is that the vehicle is to track that trajectory as accurately as possible. At the same time, the driving behavior is to be as comfortable as possible, which can result in deviations of the vehicle from the specified trajectory. Driving "comfort" is defined nowadays principally as a minimization of jerky motions of the vehicle, which can be regarded as a minimal change in vehicle acceleration.

Also known in the context of highly automated driving are functions that are intended to operate actuators (engine, clutch, brakes, etc.) of the vehicle at an energetically efficient working point, in particular in order to minimize $CO_2$ emission. When an actuator is operated at an energetically optimized working point, a vehicle speed results therefrom as a degree of freedom.

SUMMARY

An object of the invention is to furnish an improved method for operating an automated motor vehicle.

According to a first aspect, the object is achieved with a method for operating an automated motor vehicle, where the method includes: ascertaining a target trajectory for the motor vehicle; acquiring environmental data of the motor vehicle; ascertaining a tolerance region of the target trajectory based on the acquired environmental data; and guiding the motor vehicle in the tolerance region of the target trajectory in such a way that guidance of the motor vehicle with the smallest possible changes in acceleration and/or with energetically optimized propulsion is definedly more highly prioritized than definedly accurate guidance of the motor vehicle along the target trajectory.

It is thereby advantageously possible to take into account either a comfort aspect and/or an aspect relating to definedly prioritized energy-optimized operation of the motor vehicle as compared with guidance of the motor vehicle along a target trajectory, provided the vehicle is located within a defined tolerance region of the target trajectory. Additional advantageous aspects can thereby be implemented in the context of automated operation of the motor vehicle.

According to a second aspect, the object is achieved with an apparatus for operating an automated motor vehicle, where the apparatus includes: a first control device with which the motor vehicle is definedly guidable along a target trajectory; and a second control device that is functionally connected to the first control device, where a definedly energetically optimized operating mode of the motor vehicle and/or an operating mode of the motor vehicle with minimized changes in acceleration as compared with guidance of the motor vehicle along the target trajectory, is executable by way of the second control device as a function of acquired environmental data.

An advantageous refinement of the method provides that the prioritized operating mode of the motor vehicle is carried out by way of a modification of parameters of control devices. An easily executable capability for achieving the prioritized motor vehicle operating mode is thereby furnished.

A further advantageous refinement of the method provides that the prioritized operating mode of the motor vehicle is carried out by way of a limitation of gradients of actuators of the motor vehicle. An alternative capability for carrying out the prioritized operating mode of the motor vehicle is thereby furnished.

A further advantageous refinement of the method provides that the energetically optimized operating mode is also used in a manual operating mode of the motor vehicle. The proposed method can thereby advantageously also be used for manually controlled motor vehicles.

A further advantageous refinement of the method provides that the defined guidance of the motor vehicle along the target trajectory is carried out by way of a first control device, and the definedly prioritized operation of the motor vehicle is carried out by way of a second control device. The control tasks can thereby advantageously be divided between two separate control devices.

A further advantageous refinement of the method provides that the operation of the two control devices is controlled by way of anti-wind-up actions. An advantageous result thereby achieved is that the two control devices do not, if at all possible, work against one another. The advantageous result that can thereby be achieved is that one of the two control devices does not lose its working point.

A further advantageous refinement of the method provides that the first control device and the second control device are embodied as a multi-variable controller or as a fuzzy controller. A smooth transition between the two different control objectives can advantageously be achieved with the aforesaid control devices.

A further advantageous refinement of the method provides that longitudinal guidance of the motor vehicle is carried out by way of the method. It is thereby advantageously possible to use, for the method, motor vehicle assistance systems known per se for longitudinal dynamics, for example an ACC assistant, traffic jam assistant, traffic jam pilot, highway pilot, etc.

According to an example embodiment, a method includes processing circuitry determining a target trajectory, obtaining environmental data, defining a tolerance range about the target trajectory based on the environmental data, and, based on the target trajectory, guiding a motor vehicle along an actual route that veers from the target trajectory in regions where the veering minimizes changes in acceleration of the vehicle and/or optimizes energy consumption, the veering being limited to within the tolerance range.

The invention will be described in detail below with further features and advantages on the basis of several figures. The figures are intended principally to elucidate certain principles of the invention, and are not necessarily executed at exact scale.

Disclosed method features can be gathered analogously from corresponding disclosed apparatus features, and vice versa. This means in particular that features, technical advantages, and embodiments relating to the method can be gathered analogously from corresponding embodiments, features, and advantages of the apparatus, and vice versa.

DETAILED DESCRIPTION

The term "automated motor vehicle" is used hereinafter with the synonymous meanings of a "partly automated motor vehicle," "autonomous motor vehicle," and "partly autonomous motor vehicle."

In situations in which accurate positioning of the vehicle is not obligatorily necessary, the proposed method acquires and uses environmental data and information (for example, data acquired via ultrasound, radar, lidar, camera, etc.) and navigation data, in order to permit tolerable deviations from a driving task. These tolerances can be used in particular in the automated driving mode and also additionally, optionally, in the manual driving mode.

If the particular driving situation requires accurate positioning of the vehicle or if the driver's input must be accurately complied with (for example, accurate merging into a gap in traffic), these permitted tolerances are reduced or set to zero in situation-dependent fashion.

Accurate positioning of the vehicle is only necessary, for example, if objects in the environment require an accurately defined driving behavior. Accurate positioning of the vehicle is not obligatorily necessary, however, if the distance to objects in the environment is sufficient or if no further traffic participants are detected. In this case, a deviation from the target position of the vehicle is permissible provided the deviation lies within a collision-free space.

In this case, for example, a comfort criterion can be given greater consideration than accurate positioning of the vehicle. This can result in small deviations from the planned position, so that different control objectives result for the two situations.

Figure 1:
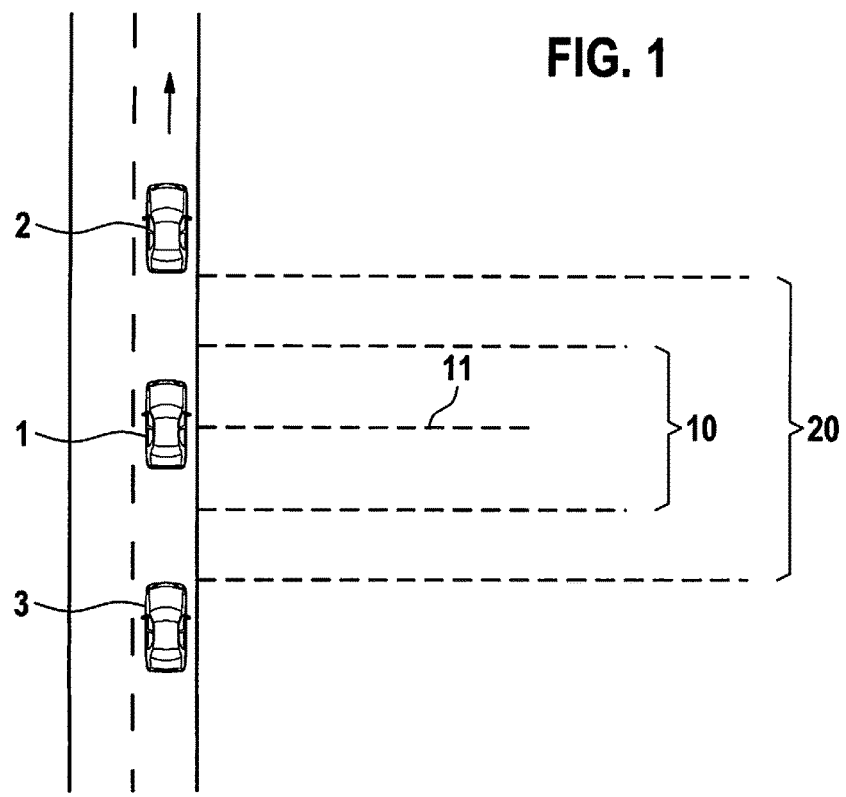
FIG. 1 is a schematic depiction of a manner of operation of a method according to an example embodiment of the present invention.

FIG. 1 shows a snapshot of a scenario to explain the method according to an example embodiment of the present invention. A first vehicle 1 is shown, between a preceding second vehicle 2 and a following third vehicle 3. Vehicles 2, 1, and 3 are driving in the same lane of the right half of the roadway, in a travel direction indicated by an arrow. First vehicle 1 is embodied as an automated vehicle whose driving motion is controlled at least in the direction of travel ("longitudinal control"). For positional control of first vehicle 1, a target trajectory, along which first vehicle 1 is guided to a target position 11, is calculated for this purpose by way of a trajectory controller (not depicted).

First vehicle 1 moves in a collision-free region or corridor 20 that marks a region in which first vehicle 1 can move and in which a risk of a collision with vehicles 2, 3 is minimized. Collision-free region 20 thus represents in principle a prescribed region within which, for reasons of traffic safety, a target trajectory for first vehicle 1 must be constituted. Conventionally, collision-free region 20 is ascertained from a so-called driving task ("guidance assistance domain") and conveyed to the trajectory planner.

Based on environmental and navigation data, the proposed method calculates a tolerance region or tolerance band 10 around target position 11 of the target trajectory, within which region first vehicle 1 is permitted to deviate from the target speed or target position 11. This tolerance region 10 must be located within collision-free region 20. If no objects are present in the acquisition region of the environmental sensor suite, the boundary of tolerance region 10 depends on limitations of road traffic regulations (e.g., speed limits, minimum spacing, etc.) and on a perception as to what the driver feels to be plausible and comfortable.

In tolerance region 10, provision is made that the target trajectory is optimally tracked. Provision is made that a comfort criterion (e.g., minimized jerking) and/or an energy efficiency criterion (e.g., minimized fuel consumption) is definedly more highly prioritized as compared with trajectory-tracking control.

This can be achieved, for example, by switching over parameter sets and/or by limiting the gradients of actuators (in particular, an internal combustion engine and braking device of the vehicle). If greater attention is being paid to comfort, brief overshoots or undershoots of the planned target trajectory can then occur. These deviations are permissible provided they lie within tolerance region 10.

If first vehicle 1 approaches the boundaries of tolerance region 10 or crosses them, first vehicle 1 is then exceeding the tolerable position deviation. After departure from tolerance region 10, the position of first vehicle 1 is definedly more highly prioritized as compared with the two aforesaid priority aspects. Transverse guidance of first vehicle 1 can advantageously be controlled by the driver.

In this case the control objective is maximally exact trajectory-tracking control, which means that the positioning of first vehicle 1 is definedly more strongly weighted as compared with the priority aspects. This control objective can be achieved, for example, by switching over the parameterizations of the trajectory-tracking controller or of subordinate controllers, and by way of other limitations of the gradients of the reference variable or manipulated variable.

If an object is detected by the environmental sensor suite of first vehicle 1 in the resolution space for the trajectory planner, collision-free region 20 then becomes smaller or shorter. Tolerance region 10 accordingly also becomes smaller. Even in this case, there continues to be a possibility for prioritizing the comfort aspect and/or the energy efficiency aspect within tolerance region 10, although here the positioning of first vehicle 1 becomes more significant. The "latitude" for comfort and/or for energy efficiency becomes smaller, however, due to the smaller tolerance region 10.

If the specific driving situation requires accurate positioning of first vehicle 1, for example when a gap needs to be merged into with high precision (e.g., when driving on an expressway), tolerance region 10 must then be set to be very small or zero. In this case comfort criteria and/or energy efficiency criteria for controlling first vehicle 1 are ignored, and maximally exact positional control of first vehicle 1 to target position 11 of the target trajectory is implemented.

FIG. 1 thus shows, by way of example, how tolerance region 10 can be implemented with an adaptive cruise control unit in an ACC tracking situation. If the distance of first vehicle 1 from the front second vehicle 2 or from the rear third vehicle 3 is sufficiently long, i.e., if first vehicle 1 is located within tolerance region 10, the target trajectory can then be tracked while maintaining comfort criteria and/or criteria relating to energy efficiency. If this results in a situation in which first vehicle 1 departs from tolerance region 10, however, the positioning of first vehicle 1 at target position 11 is definedly prioritized. Performance of this driving task can then result in comfort shortcomings and/or in shortcomings with regard to energy efficiency (e.g., elevated fuel consumption), although collisions of vehicle 1 with other vehicles 2, 3 can advantageously be prevented.

A fuzzy controller or multi-variable controller can be used, for example, to avoid continual "jumping" between the two control objectives. The purpose of these controllers is to establish a compromise between the two control objectives. Prioritization in the energy efficiency mode should be based on maximally efficient application of control to the actuators with no departure from tolerance region 10. Otherwise "hunting" would occur due to constant changeovers between the tolerance bands (tolerance region 10 and collision-free region 20). This would be the fault of the continual changeover between different control objectives.

If actuators of first vehicle 1 are operated in energy-optimized fashion within tolerance region 10, the result thereof is a speed profile, and it is necessary to ensure that that profile satisfies the priority criteria of the trajectory planner.

For example, in a hybrid vehicle it is energetically favorable to switch between gliding phases and phases of optimized control application to the internal combustion engine. This results in a kind of "sawtooth" in the speed curve, as indicated in principle in FIG. 2.

Figure 2:
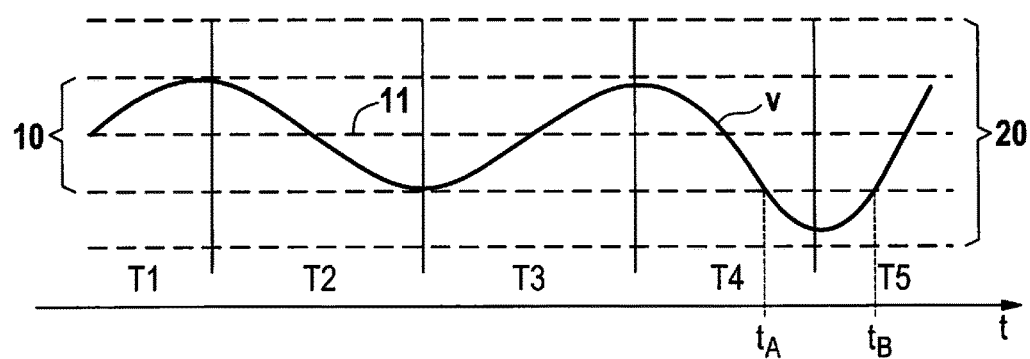
FIG. 2 depicts a speed curve of a motor vehicle during execution of the method according to an example embodiment of the present invention.

FIG. 2 shows a curve for a speed v of first vehicle 1 over time, showing collision-free region 20 in which tolerance region 10 having target position 11 of the target trajectory is located. The wave-like profile of speed v of first vehicle 1 over time t is evident, an internal combustion engine of first vehicle 1 being active in phases T1, T3, and T5. In phases T2, T4 in turn, "gliding" of first vehicle 1 occurs, in which first vehicle 1 proceeds essentially without consuming fuel because an internal combustion engine is inactive or switched off.

The result is that in this manner, phases with an active internal combustion engine alternate with phases with an inactive internal combustion engine, so that on average over all the phases, first vehicle 1 is moved at a constant speed. An energy-optimized or energy-efficient driving mode of first vehicle is thereby advantageously promoted. Tolerance region 10 must in this case be sufficiently restricted that this behavior appears plausible to the driver of first vehicle 1.

If an energy-optimized application of control to the actuators, as described in the utilization example of FIG. 2, results in a departure from tolerance region 10 at time $t_A$, positional control is thereby advantageously prioritized as compared with energy-optimized application of control to the actuators. This behavior can occur, for example, due to an unknown upward slope that was not taken into account in the control algorithm for the gliding phase. Beyond tolerance region 10, as of time $t_A$ the full performance spectrum of the actuators is therefore used in order to bring vehicle 1 back to the planned target position 11. As a result thereof, as of time $t_B$ first vehicle 1 is once again located in tolerance region 10. As of time $t_B$, energy-optimized control can thus once again advantageously be prioritized as compared with positional control of first vehicle 1.

If energy-optimized control of the actuators and positional control are active simultaneously, the two control algorithms will then work against one another, meaning that in the case of a prioritized operating mode of one controller, the other controller must be switched to be passive. Otherwise, working points (e.g., an I component of a PID controller) in the controllers can drift apart.

As a solution to this problem, for example, tolerance region 10 can be used, in addition to its actual function, as a dead zone for the tracking controller. A further solution is to provide anti-wind-up actions, known per se, in the controllers, with which suitable information can be exchanged between the two controllers so that the two controllers do not interfere with one another.

Figure 3:
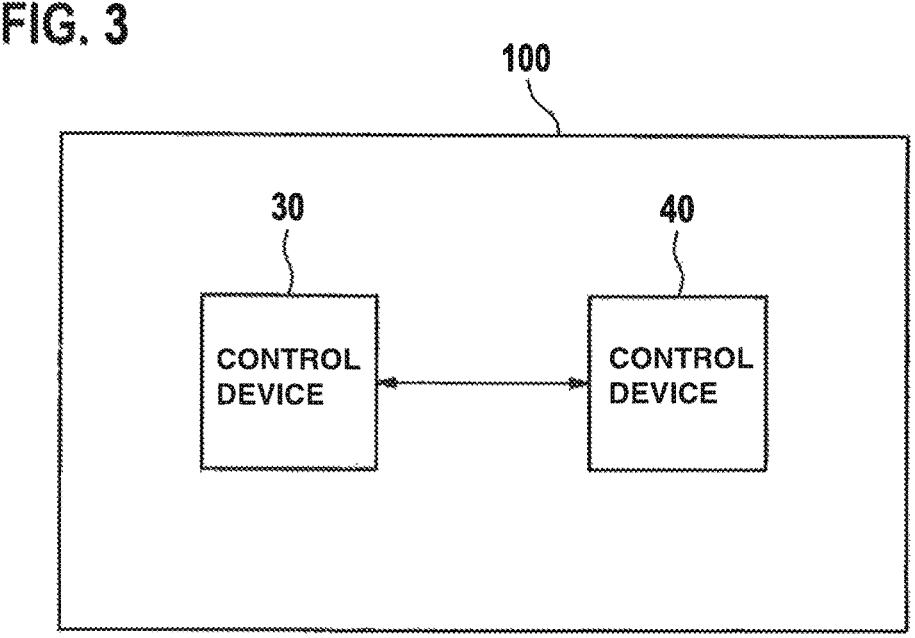
FIG. 3 is a schematic block diagram of an embodiment of an apparatus according to an example embodiment of the present invention.

FIG. 3 is a block diagram of an embodiment of an apparatus 100 according to an example embodiment of the present invention. A first control device 30, in the form of a trajectory-tracking controller for accurate guidance of first vehicle 1 to target position 11 of the target trajectory, is shown. First control device 30 is functionally connected to a second control device 40 that pursues a different control objective from first control device 30, for example in the form of minimized changes in acceleration and/or energy-optimized operation of the motor vehicle.

Figure 4:
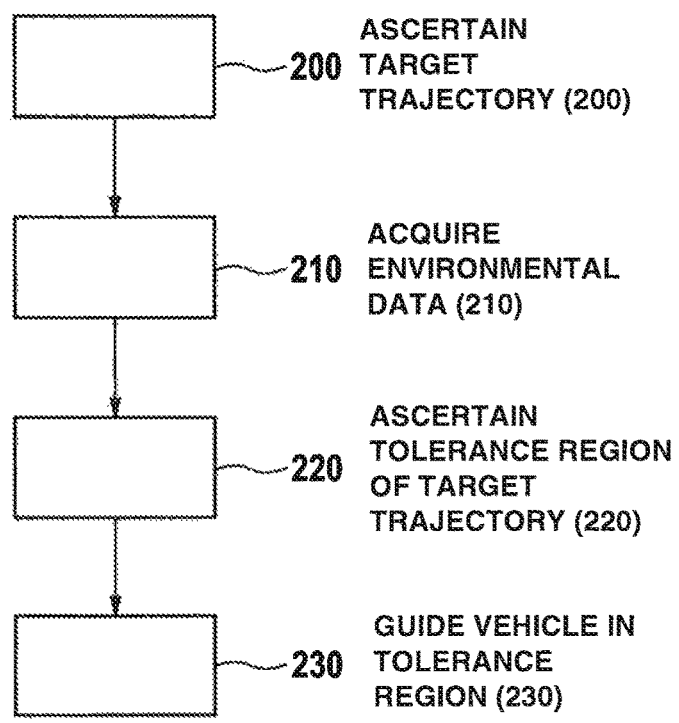
FIG. 4 is a flowchart that illustrates execution of a method according to an example embodiment of the present invention.

FIG. 4 is a flowchart that illustrates execution of a method according to an example embodiment of the present invention.

In a step 200, a target trajectory for motor vehicle 1 is ascertained. In a step 210, environmental data of motor vehicle 1 are acquired. In a step 220, a tolerance region 10 of the target trajectory is ascertained based on the acquired environmental data.

In a step 230, motor vehicle 1 is guided in tolerance region 10 of the target trajectory in such a way that guidance of motor vehicle 1 with maximally small changes in acceleration and/or with energy optimized propulsion is definedly more highly prioritized than definedly accurate guidance of motor vehicle 1 along the target trajectory.

In summary, example embodiments of the present invention are directed to operating an automated motor vehicle in which operation, in the case in which the vehicle is located in a tolerance region, an aspect relating to comfort and/or relating to energy-saving operation of the vehicle is definedly more highly prioritized than exact positional control of the motor vehicle. The result is that a comfortable and/or energy-saving operating mode of the motor vehicle is implemented. The method according to the present invention can be useful in particular in situations in which highly accurate automated guidance or positioning of the motor vehicle along a predefined target trajectory is not necessary.

One skilled in the art will suitably modify the features of the invention, and/or combine them with one another, without deviating from the essence of the invention.

What is claimed is:

1. A method for operating an automated motor vehicle, the method comprising:
   acquiring, by the controller, environmental data and navigation data of the motor vehicle, wherein the data includes a collision free region or corridor that marks a region in which the motor vehicle can move and in which a risk of collision with longitudinally adjacent vehicles is minimized, wherein the collision free region or corridor represents a prescribed region within which the target trajectory must be constituted;
   ascertaining, by a controller, a target trajectory along which the motor vehicle is guided to a target speed or a target position;
   ascertaining, by the controller, a tolerance region of the target trajectory based on the acquired data, wherein the tolerance region is around the target speed or the target position of the target trajectory, within which region the motor vehicle is permitted to deviate from the target speed or the target position, and wherein the tolerance region is located within the collision free region; and guiding, by the controller, the motor vehicle in the tolerance region of the target trajectory;

wherein the guiding is performed according to prioritized criteria that includes: (a) at least one of a minimization of a change in acceleration of the motor vehicle and an energetic optimization of a propulsion at a first priority level, and (b) accurate guidance of the motor vehicle along the target trajectory at a second priority level that is lower than the first priority level.

2. The method of claim 1, wherein the guiding is performed via modification of parameters of control devices.

3. The method of claim 1, wherein the guiding is performed via limitation of gradients of actuators of the motor vehicle.

4. The method of claim 1, wherein the energetic optimization is also used in a manual operating mode of the motor vehicle.

5. The method of claim 1, wherein the guiding is performed using a first control device of the controller to track trajectory and a second control device of the controller to control at least one of the minimization of the change in acceleration and the energetic optimization.

6. The method of claim 5, wherein operation of the two control devices is controlled by way of anti-wind-up actions.

7. The method of claim 5, wherein the first control device and the second control device are embodied as a multi-variable controller or as a fuzzy controller.

8. The method of claim 1, wherein the guiding includes longitudinal guidance of the motor vehicle.

9. An apparatus for operating an automated motor vehicle, comprising:
a first control device; and
a second control device that is functionally connected to the first control device;
wherein the first control device is configured to control guidance of the motor vehicle by performing the following:
acquiring environmental data and navigation data of the motor vehicle, wherein the data includes a collision free region or corridor that marks a region in which the motor vehicle can move and in which a risk of collision with longitudinally adjacent vehicles is minimized, wherein the collision free region or corridor represents a prescribed region within which the target trajectory must be constituted;
ascertaining a target trajectory along which the motor vehicle is guided to a target speed or a target position;
ascertaining a tolerance region of the target trajectory based on the acquired data, wherein the tolerance region is around the target speed or the target position of the target trajectory, within which region the motor vehicle is permitted to deviate from the target speed or the target position, and wherein the tolerance region is located within the collision free region; and
wherein the second control device is configured to, based on the environmental data and the navigation data, modify the guidance based on prioritized criteria that includes: (a) at least one of a minimization of a change in acceleration of the motor vehicle and an energetic optimization of a propulsion at a first priority level, and (b) accurate guidance of the motor vehicle along the target trajectory at a second priority level that is lower than the first priority level.

10. The apparatus of claim 9, wherein the first control device and the second control device are embodied as a multi-variable controller or as a fuzzy controller.

11. A non-transitory computer-readable medium having a computer program, which is executable by a processor, comprising:
a program code arrangement having program code for operating an automated motor vehicle, by performing the following:
acquiring, by the controller, environmental data and navigation data of the motor vehicle, wherein the data includes a collision free region or corridor that marks a region in which the motor vehicle can move and in which a risk of collision with longitudinally adjacent vehicles is minimized, wherein the collision free region or corridor represents a prescribed region within which the target trajectory must be constituted;
ascertaining a target trajectory along which the motor vehicle is guided to a target speed or a target position;
ascertaining a tolerance region of the target trajectory based on the acquired data, wherein the tolerance region is around the target speed or the target position of the target trajectory, within which region the motor vehicle is permitted to deviate from the target speed or the target position, and wherein the tolerance region is located within the collision free region; and
guiding the motor vehicle in the tolerance region of the target trajectory, wherein the guiding is performed according to prioritized criteria that includes: (a) at least one of a minimization of a change in an acceleration of the motor vehicle and an energetic optimization of a propulsion at a first priority level, and (b) accurate guidance of the motor vehicle along the target trajectory at a second priority level that is lower than the first priority level.

* * * * *